(12) United States Patent
Watanabe

(10) Patent No.: US 10,855,954 B2
(45) Date of Patent: Dec. 1, 2020

(54) PERIPHERY MONITORING DEVICE

(71) Applicant: AISIN SEIKI KABUSHIKI KAISHA, Kariya (JP)

(72) Inventor: Kazuya Watanabe, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 40 days.

(21) Appl. No.: 16/312,484

(22) PCT Filed: Mar. 14, 2017

(86) PCT No.: PCT/JP2017/010271
§ 371 (c)(1),
(2) Date: Dec. 21, 2018

(87) PCT Pub. No.: WO2018/003193
PCT Pub. Date: Jan. 4, 2018

(65) Prior Publication Data
US 2019/0149774 A1 May 16, 2019

(30) Foreign Application Priority Data
Jun. 29, 2016 (JP) .................................. 2016-129233

(51) Int. Cl.
*H04N 7/18* (2006.01)
*B60R 1/00* (2006.01)
(Continued)

(52) U.S. Cl.
CPC ............... *H04N 7/181* (2013.01); *B60R 1/00* (2013.01); *H04N 5/445* (2013.01); *H04N 5/775* (2013.01);
(Continued)

(58) Field of Classification Search
None
See application file for complete search history.

(56) References Cited

U.S. PATENT DOCUMENTS 7,930,078 B2 * 4/2011 Sugiura .................... B60R 1/00
340/435
9,902,323 B2 2/2018 Watanabe et al.
(Continued)

FOREIGN PATENT DOCUMENTS

CN 105282499 A 1/2016
JP 2016-021653 A 2/2016

OTHER PUBLICATIONS

International Search Report of PCT/JP2017/010271 dated May 30, 2017.

*Primary Examiner* — Jayanti K Patel
*Assistant Examiner* — Stefan Gadomski
(74) *Attorney, Agent, or Firm* — Sughrue Mion, PLLC

(57) ABSTRACT

A periphery monitoring device according to an embodiment includes storage that stores therein image data generated by an imager mounted on a vehicle; a switching controller that switches between a first display mode in which current image data currently generated by the imager is displayed and a second display mode in which past image data previously generated by the imager is displayed, for display of the image data stored in the storage; and an output that outputs information to a display device at the time of switching between the first display mode for displaying the current image data being currently generated by the imager and the second display mode for displaying the past image data previously generated by the imager. The information represents a transition of the image data between when the past image data is generated and when the current image data is generated.

6 Claims, 13 Drawing Sheets

(51) Int. Cl.
*H04N 5/445* (2011.01)
*H04N 5/775* (2006.01)
*B60R 1/12* (2006.01)

(52) U.S. Cl.
CPC .............. *H04N 7/18* (2013.01); *B60R 1/12* (2013.01); *B60R 2001/1253* (2013.01); *B60R 2300/105* (2013.01)

(56) References Cited

U.S. PATENT DOCUMENTS

| | | | | |
|---|---|---|---|---|
| 10,586,226 | B2 * | 3/2020 | Van Wiemeersch | G06Q 20/3224 |
| 2002/0123829 | A1 * | 9/2002 | Kuriya | B62D 15/0275 701/1 |
| 2003/0108222 | A1 * | 6/2003 | Sato | H04N 7/183 382/104 |
| 2004/0249564 | A1 * | 12/2004 | Iwakiri | B62D 15/027 340/932.2 |
| 2004/0257244 | A1 * | 12/2004 | Kubota | B62D 15/0285 340/932.2 |
| 2004/0260439 | A1 * | 12/2004 | Endo | B60Q 1/48 701/36 |
| 2006/0271278 | A1 * | 11/2006 | Sakakibara | B62D 15/0275 701/523 |
| 2006/0287826 | A1 * | 12/2006 | Shimizu | B60K 35/00 701/431 |
| 2007/0021881 | A1 * | 1/2007 | Mori | B60Q 9/005 701/28 |
| 2007/0057816 | A1 * | 3/2007 | Sakakibara | B62D 15/027 340/932.2 |
| 2007/0088474 | A1 * | 4/2007 | Sugiura | B60R 1/00 701/36 |
| 2007/0097209 | A1 * | 5/2007 | Kubota | B62D 15/0275 348/118 |
| 2007/0106440 | A1 * | 5/2007 | Oki | B62D 15/028 701/36 |
| 2008/0129539 | A1 * | 6/2008 | Kumon | B60R 1/00 340/901 |
| 2008/0246654 | A1 * | 10/2008 | Cheng | G01C 21/20 342/357.64 |
| 2009/0079828 | A1 * | 3/2009 | Lee | B60R 1/00 348/148 |
| 2010/0001881 | A1 * | 1/2010 | Sugie | B60R 1/00 340/932.2 |
| 2010/0201818 | A1 * | 8/2010 | Imanishi | B60R 1/00 348/148 |
| 2010/0245574 | A1 * | 9/2010 | Imanishi | B60R 1/00 348/148 |
| 2010/0245575 | A1 * | 9/2010 | Mori | B60R 1/00 348/148 |
| 2010/0289634 | A1 * | 11/2010 | Ikeda | B60Q 9/005 340/441 |
| 2011/0057782 | A1 * | 3/2011 | Chundrlik, Jr. | B60R 1/00 340/436 |
| 2011/0304726 | A1 * | 12/2011 | Zhang | H04N 5/23238 348/118 |
| 2013/0010117 | A1 | 1/2013 | Miyoshi et al. | |
| 2013/0010118 | A1 * | 1/2013 | Miyoshi | G06T 3/40 348/148 |
| 2013/0046441 | A1 * | 2/2013 | Marczok | B60R 1/00 701/41 |
| 2013/0229524 | A1 * | 9/2013 | Vovkushevsky | B60R 1/00 348/148 |
| 2013/0300872 | A1 * | 11/2013 | Park | B60R 1/00 348/148 |
| 2014/0118551 | A1 * | 5/2014 | Ikeda | B60R 1/00 348/148 |
| 2014/0244070 | A1 * | 8/2014 | Inagaki | B62D 15/0285 701/1 |
| 2014/0300743 | A1 * | 10/2014 | Kumon | G06T 11/00 348/148 |
| 2014/0327776 | A1 * | 11/2014 | Michiguchi | G08G 1/166 348/148 |
| 2015/0078624 | A1 * | 3/2015 | Fukuda | G08G 1/168 382/104 |
| 2015/0191119 | A1 * | 7/2015 | Hikita | H04N 7/181 348/148 |
| 2015/0254981 | A1 * | 9/2015 | Tachibana | B60R 1/00 340/932.2 |
| 2015/0321607 | A1 * | 11/2015 | Cho | B60R 11/04 348/36 |
| 2016/0009225 | A1 * | 1/2016 | Watanabe | B60R 1/002 348/148 |
| 2016/0078763 | A1 * | 3/2016 | Kiyokawa | G06K 9/00812 382/104 |
| 2016/0176349 | A1 | 6/2016 | Miyoshi et al. | |
| 2016/0364619 | A1 * | 12/2016 | Ogata | G06K 9/00362 |
| 2017/0144599 | A1 * | 5/2017 | Lee | H04N 5/2628 |
| 2017/0148136 | A1 * | 5/2017 | Lee | H04N 7/183 |
| 2017/0282813 | A1 * | 10/2017 | Hashimoto | B60R 1/00 |
| 2018/0009379 | A1 * | 1/2018 | Itou | B60R 1/00 |
| 2018/0178725 | A1 * | 6/2018 | Miyoshi | G06F 3/0412 |
| 2019/0308609 | A1 * | 10/2019 | Gieseke | B62D 15/028 |

* cited by examiner

PERIPHERY MONITORING DEVICE

CROSS-REFERENCE TO RELATED APPLICATIONS

This application is national stage application of International Application No. PCT/JP2017/010271, filed Mar. 14, 2017, which designates the United States, incorporated herein by reference, and which claims the benefit of priority from Japanese Patent Application No. 2016-129233, filed Jun. 29, 2016, the entire contents of which are incorporated herein by reference.

TECHNICAL FIELD

The present invention relates generally to a periphery monitoring device.

BACKGROUND ART

Conventionally, vehicle-parking assistance technique has been proposed, which provides driver assistance to users by imaging the surrounding environment of a vehicle with a camera installed on a vehicle to display image data as a result of imaging.

CITATION LIST

Patent Literature

Patent Literature 1: Japanese Patent Application Laid-open No. 2016-021653

SUMMARY OF INVENTION

Problem to be Solved by the Invention

However, there is room for improvement in the conventional display method of image data generated by a camera of the vehicle. For example, it is desirable to provide a display mode for allowing a user to better understand the situation, at the time of switching image data.

Means for Solving Problem

A periphery monitoring device according to one embodiment includes storage that stores therein image data generated by an imager that is mounted on a vehicle; a switching controller that switches between a first display mode and a second display mode for display of the image data stored in the storage, the first display mode being a mode in which current image data is displayed, the second display mode being a mode in which past image data is displayed, the current image data being currently generated by the imager, the past image data is being previously generated by the imager; and an output that outputs information to a display device at the time of switching between the first display mode for displaying the current image data being currently generated by the imager and the second display mode for displaying the past image data previously generated by the imager, the information representing a transition of the image data between when the past image data is generated and when the current image data is generated. With such a configuration, for example, displaying the information representing the transition makes it possible for a user to easily understand the positional relationship.

In the periphery monitoring device according to one embodiment, at the time of switching the display of the current image data being currently generated by the imager to the display of the past image data previously generated by the imager, the output outputs image data generated by the imager during a period from when the current image data is generated and to when the past image data is generated. With such a configuration, for example, displaying the image data makes it possible for a user to easily understand the positional relationship.

In the periphery monitoring device according to one embodiment, the output superimposes, for display of the image data generated by the imager, information on the image data for output, the information indicating a current position of the vehicle. With such a configuration, for example, superimposition of the information indicating the current position of the vehicle makes it possible for a user to easily understand the positional relationship.

In the periphery monitoring device according to one embodiment, at the time of switching the display of the current image data being currently generated by the imager to the display of the past image data previously generated by the imager, the output outputs information to the past image data, the information representing a transition of a movement of the vehicle during a period from when the past image data is generated and to when the current image data is generated. With such a configuration, for example, by outputting the information representing the transition of a movement of the vehicle, a user can easily understand the positional relationship.

In the periphery monitoring device according to one embodiment, the storage stores therein image data output from the imager that images an area including a road surface in a travelling direction of the vehicle, and the switching controller switches between the first display mode and the second display mode, the first display mode being a mode in which current image data including the road surface in a current travelling direction of the vehicle is displayed, the second display mode being a mode in which past image data including the road surface in a past travelling direction of the vehicle is displayed as image data representing an underfloor of the vehicle, the current image data and the past image data both being generated by the imager. With such a configuration, for example, a user can easily understand the current condition of the underfloor of the vehicle.

DESCRIPTION OF EMBODIMENTS

Figure 1:
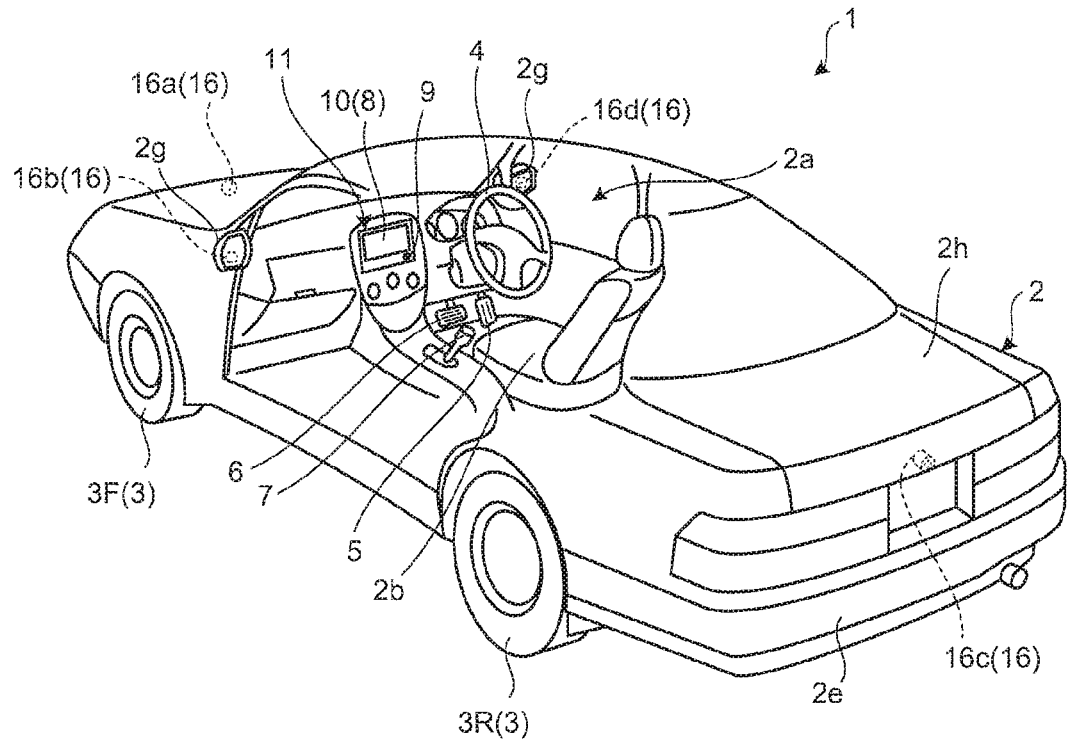
FIG. 1 is a perspective view illustrating an example of a vehicle according to a first embodiment, giving a transparent view of a part of the cabin.

Exemplary embodiments and modification below include same or like elements. In the following, thus, the same or like elements are denoted by common reference numerals, and redundant explanations will be partly omitted. Any parts of one embodiment or modification may be replaced with corresponding parts of another embodiment or modification. The configurations and the positions of the parts of one embodiment or the modification are the same as those in another embodiment or modification unless otherwise explicitly mentioned.

First Embodiment

FIG. 1 is a partially transparent perspective view illustrating an example of an interior 2a of a vehicle 1 according to the first embodiment. The vehicle 1 may be, for example, an automobile (internal combustion engine automobile) including an internal combustion (engine, not illustrated) as a driving source, or may be an automobile (such as electric vehicle and a fuel battery automobile) including an electric motor (not illustrated) as a driving source. The vehicle 1 may be an automobile (hybrid automobile) including both of them as a driving source. The vehicle 1 can include various transmissions, and various devices (such as systems and components) required for driving the internal combustion engine or the electric motor. Type, the number, and layout of devices involving the driving of wheels 3 of the vehicle 1 can be variously set.

As illustrated in FIG. 1, a vehicle body 2 defines an interior 2a in which an occupant (not illustrated) rides. In the interior 2a, disposed are a steering 4, an acceleration operator 5, a brake operator 6, a transmission operator 7, while a driver as an occupant faces a seat 2b. The steering 4 is, for example, a steering wheel that projects from a dashboard (instrument panel) 24. The acceleration operator 5 is, for example, an accelerator pedal located at the driver's feet. The brake operator 6 is, for example, a brake pedal located at the driver's feet. The transmission operator 7 is, for example, a shift lever that projects from a center console.

The steering 4, the acceleration operator 5, the brake operator 6, and the transmission operator 7 are not limited thereto.

In the interior 2a, disposed are a display device 8 (display output) and an audio output device 9 (audio output). The display device 8 is, for example, a liquid crystal display (LCD) and an organic electro-luminescence display (GELD). The audio output device 9 is, for example, a speaker. According to the first embodiment, the display device 8 is, for example, covered by a transparent operation input 10 (such as a touch panel). The occupant can view a moving image (image) displayed on the screen of the display device 8 via the operation input 10. The occupant can perform operation inputs (command inputs) by operating the operation input 10 including touching, pressing, or moving with his or her finger at a location corresponding to the moving image (image) displayed on the screen of the display device 8. In the embodiment, as an example, the display device 8, the audio output device 9, and the operation input 10 are disposed, for example, on a monitor device 11 located at the center of the dashboard 24 in a vehicle width direction (lateral direction). The monitor device 11 includes operation elements (not illustrated) such as a switch, a dial, a joystick, and a push button. Alternatively, an audio output device (not illustrated) may be disposed at a different location from the monitor device 11 in the interior 2a. Another audio output device different from the audio output device 9 of the monitor device 11 can output audio. In the embodiment, for example, the monitor device 11 is used as a navigation system and an audio system. A monitor device for a periphery monitoring device may be provided separately from such systems.

Figure 2:
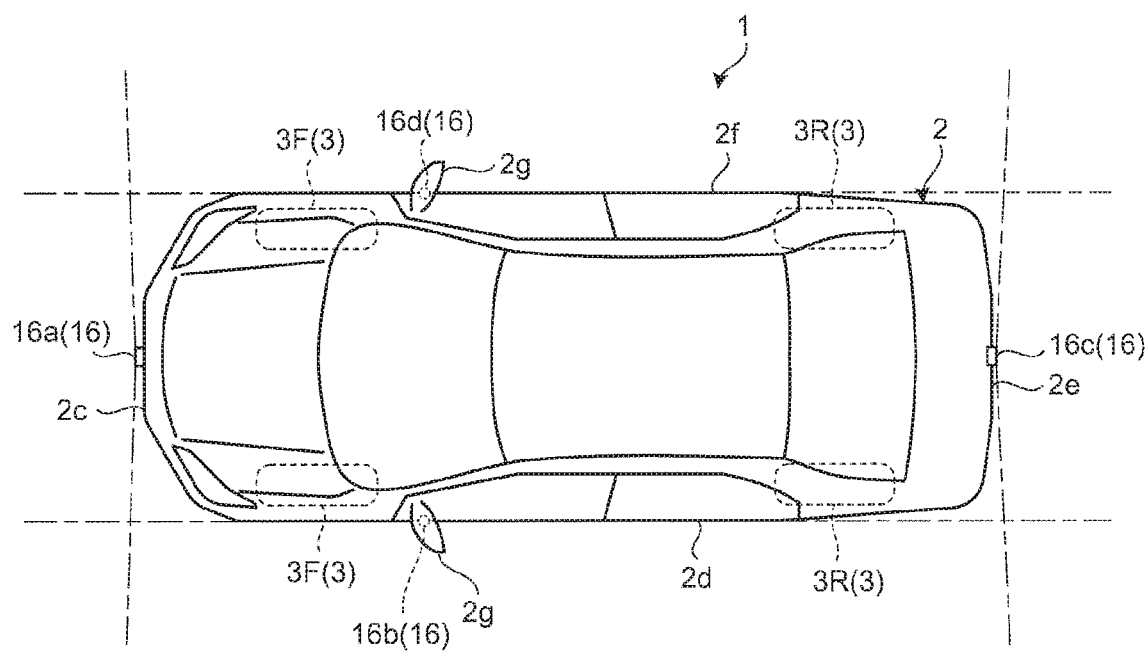
FIG. 2 is a plan view (bird-eye view) illustrating an example of the vehicle according to the first embodiment.

As illustrated in FIGS. 1 and 2, in the embodiment, as an example, the vehicle 1 is a four-wheel vehicle (four-wheel automobile), and includes two right and left front wheels 3F and two right and left rear wheels 3R. The tire angle of the front wheels 3F changes (steers) along with the operation of the steering 4 (steering wheel), for example. A steering system 13 is an electric power steering system or a steer-by-wire (SBW) system, for example. The steering system 13 drives an actuator 12a to add torque (assist torque) to the steering 4 for assisting a steering force, to steer the front wheels 3F. In another embodiment, the steering system 13 may steer the front wheels and the rear wheels independently or in coordination with each other. The two front wheels 3F are steered substantially in parallel in the same phase (in the same phase, in the same steering direction, in the same rotating direction), and the two rear wheels 3R are steered substantially in parallel in the same phase, as an example. The driving wheels can be set variously.

In the embodiment, as an example, as illustrated in FIG. 2, the vehicle 1 (the body 2) is provided with a plurality of (in the embodiment, four, as an example) imagers 16 (16a to 16d). The imagers 16 are digital cameras incorporating an image sensor such as a charge coupled device (CCD) or a complementary metal oxide semiconductor (CMOS) image sensor (CIS). The imagers 16 can output image data (moving image data, frame data) at a certain frame rate. The imagers 16 each include a wide-angle lens or a fisheye lens, and can capture the horizontal range (viewing angle) of, for example, 140° to 190°. The optical axes of the imagers 16 are set downward (vertically or obliquely downward). Thus, the imagers 15 sequentially output image data of ambient environment around the vehicle 1, including road surface on which the vehicle 1 is movable.

In the embodiment, as an example, the imager 16a is located at a front end 2c (an end in plan view) of the body 2 (on the front side in the vehicle lengthwise direction) on the front bumper. An imager 16b is located at a left-side end 2d of the body 2 (on the left side in the vehicle width-direction) at a left side mirror 2g (protrusion). An imager 16c is located at a rear end 2e of the body 2 (the rear side in the vehicle lengthwise direction) on a lower wall of a rear trunk door 2h. The imager 16d is located at a right-side end 2f of the body 2 (the right side in the vehicle width-direction) at the right side mirror 2g (protrusion). The embodiment is, however, not intended to limit how to install the cameras on the vehicle, and the cameras may be installed arbitrarily as long as the cameras can generate image data forward, laterally, and rearward with respect to the vehicle 1.

An ECU 24 can execute computation and image processing to the image data generated by the imagers 16, and display the image data being subjected to the image processing on the display device 8.

Figure 3:
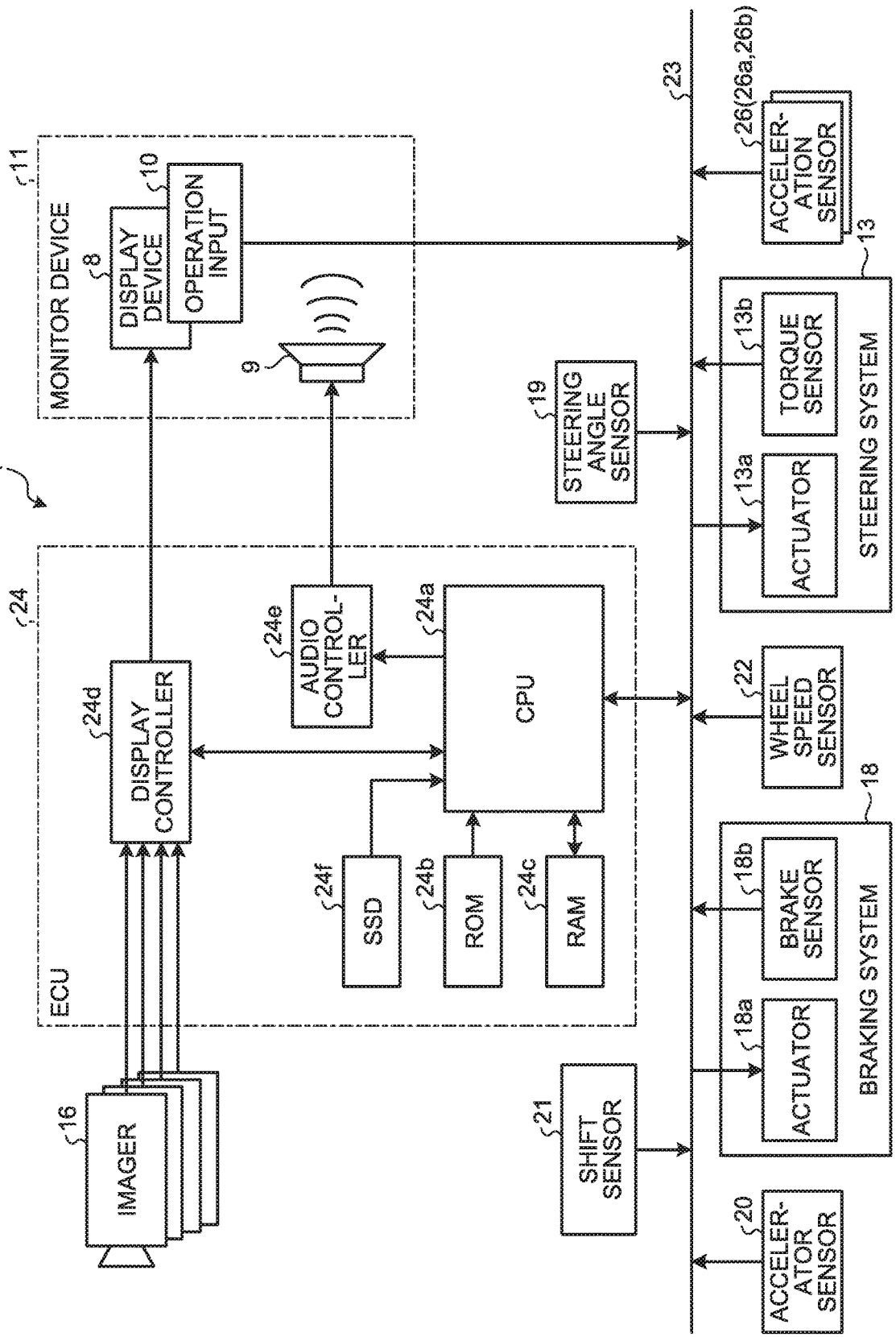
FIG. 3 is a block diagram illustrating an example of a periphery monitoring system in the vehicle according to the first embodiment.

FIG. 3 is a block diagram for explaining the configuration of the vehicle 1 according to the embodiment. As illustrated in FIG. 3, the vehicle 1 further includes the steering system 13, a braking system 18, a steering angle sensor 19, an accelerator sensor 20, a shift sensor 21, a wheel speed sensor 22, an in-vehicle network 23, and the ECU 24 (electronic control unit). The monitor device 11, the steering system 13, the imagers 16, the braking system 18, the steering angle sensor 19, the accelerator sensor 20, the shift sensor 21, the wheel speed sensor 22, and the ECU 24 function as a periphery monitoring system (periphery monitoring device).

The monitor device 11, the steering system 13, the brake system 18, the steering angle sensor 19, the accelerator sensor 20, the shift sensor 21, the wheel speed sensor 22, and the ECU are electrically connected through an in-vehicle network 23 as an electric communication line. For example, the in-vehicle network 23 is a controller area network (CAN).

In the embodiment, the vehicle 1 is provided with two acceleration sensors 26 (26a, 26b). The embodiment is, however, not intended to limit the acceleration sensors thereto, and the acceleration sensor may be any sensor capable of detecting the acceleration of the vehicle 1 in the lateral direction. In the embodiment, accelerations in the lengthwise directions and in the horizontal directions are derived.

The steering system 13 is an electric power steering system or a steer-by-wire (SBW) system, for example. The steering system 13 includes an actuator 13a and a torque sensor 13b. The steering system 13 is electrically controlled by the ECU 24, for example, and causes the actuator 13a to operate. The torque sensor 13b transmits the torque to the ECU 24.

The braking system 18 includes an actuator 18a and a brake sensor 18b. The braking system 18 applies a braking force to the wheels 3 via the actuator 18a. The brake sensor 18b transmits the position of the brake pedal, as a movable part of the brake operator 6, to the ECU 24, for example.

The steering angle sensor 19 is a sensor that detects the steered amount of the steering 4, such as a steering wheel, for example. The steering angle sensor 19 transmits steering angle information such as the steered amount of the steering 4 steered by a driver, or the steered amount of the wheels 3, at the time of automatic steering, to the ECU 24.

The accelerator sensor 20 is a displacement sensor that detects the position of the acceleration pedal as a movable part of the acceleration operator 5, for example. The accelerator sensor 20 transmits the position of the acceleration operator 5 to the ECU 24.

The shift sensor 21 is a sensor that detects the position of a movable part of the transmission operator 7, for example, and transmits the position of the movable part of the transmission operator 7 to the ECU 24 as shift information.

The wheel speed sensor 22 is a sensor that detects the amount of rotation or the rotation speed per unit time of the wheels 3. The wheel speed sensor 22 transmits wheel speed pulse count indicating the detected rotation speed to the ECU 24 as wheel speed information.

The ECU 24 can receive results of the detection from the torque sensor 13b, the brake sensor 18b, the steering angle sensor 19, the accelerator sensor 20, the shift sensor 21, the wheel speed sensor 22, and the acceleration sensors 26, and command signals (control signals, operation signals, input signals, data) from the operation input 10 or the like, via the in-vehicle network 23.

The ECU 24 receives image data from the imagers 16. The ECU 24 may receive the image data from the imagers 16 via the in-vehicle network 23. The ECU 24 is a computer, for example. The ECU 24 includes a central processing unit (CPU) 24a, read-only memory (ROM) 24b, a random access memory (RAM) 24c, a display controller 24d, an audio controller 24e, and a solid-state drive (SSD) 24f. The CPU 24a, the ROM 24b, and the RAM 24c may be integrated in the same package.

The CPU 24a reads a computer program from a non-volatile storage device such as the ROM 24b, and executes various types of operations and control, following the computer program. For example, the CPU 24a executes image processing on the image to be displayed on the display device 8.

The ROM 24b stores therein computer programs and parameters required for executing the computer programs. The RAM 24c temporarily stores therein various types of data used in the operations of the CPU 24a. The display controller 24d mainly executes, among the operations executed by the ECU 24, processing such as acquiring images from the imagers 16 and outputting them to the CPU 24a, and data conversion of an image to be displayed, acquired from the CPU 24a and to be displayed on the display device 8. Among the operations executed by the ECU 24, the audio controller 24e mainly processes audio acquired from the CPU 24a and to be output to the audio output device 9. The SSD 24f is a rewritable non-volatile storage, and retains data acquired from the CPU 24a even upon power-off of the ECU 24.

Figure 4:
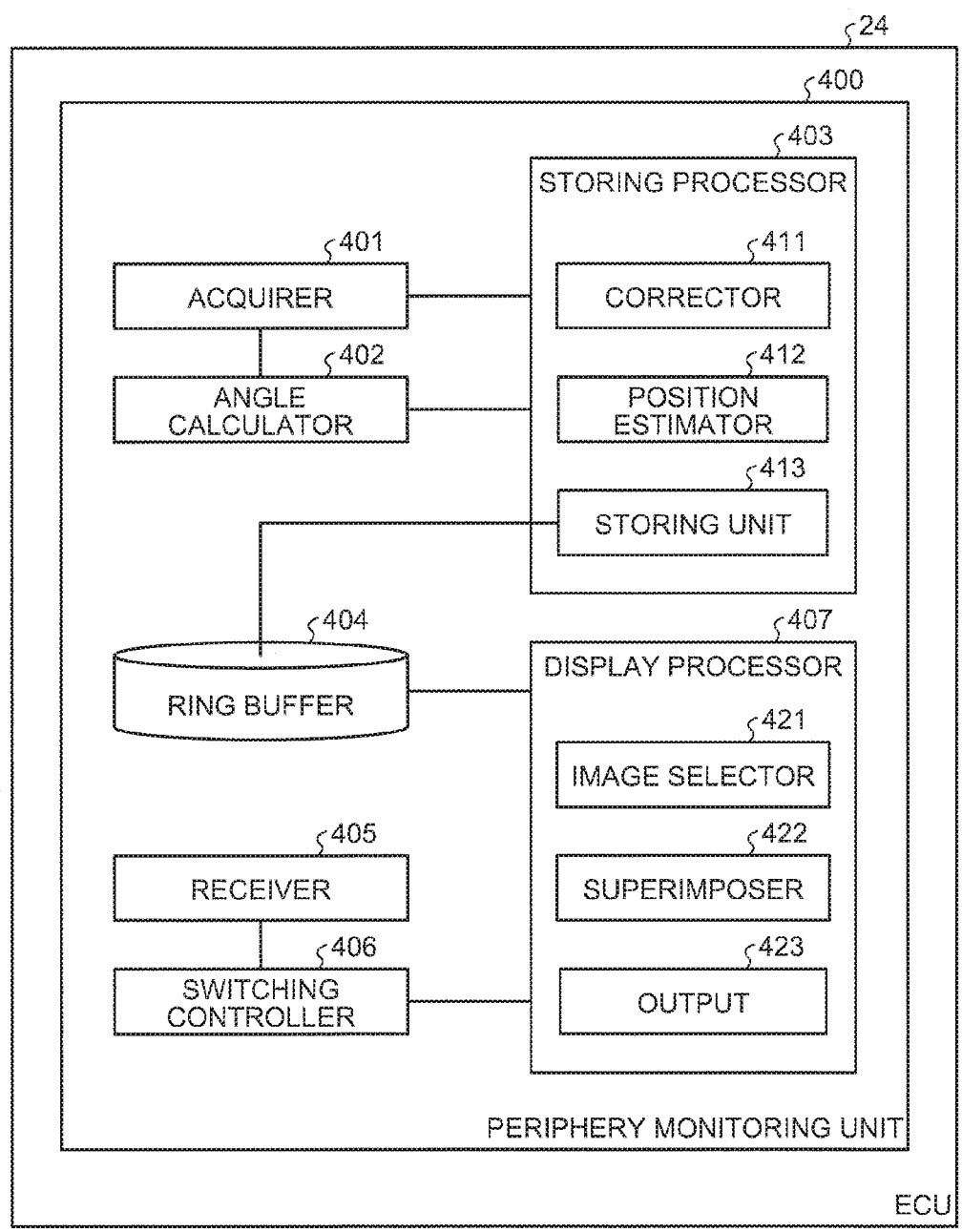
FIG. 4 is a block diagram illustrating a configuration of a periphery monitoring unit implemented on an ECU according to the first embodiment.

FIG. 4 is a block diagram illustrating a configuration of a periphery monitoring unit 400 implemented on the ECU 24 according to the embodiment. An acquirer 401, an angle calculator 402, a storing processor 403, a receiver 405, a switching controller 406, and a display processor 407, illustrated in FIG. 4, are implemented by causing the CPU 24a provided as the ECU 24 illustrated in FIG. 3 to execute software stored in the ROM 24b (computer-readable recording medium). The software (computer program) may be provided via another computer-readable recording medium. The periphery monitoring unit 400 also implements a ring buffer 404 on the RAM 24c.

Figure 5:
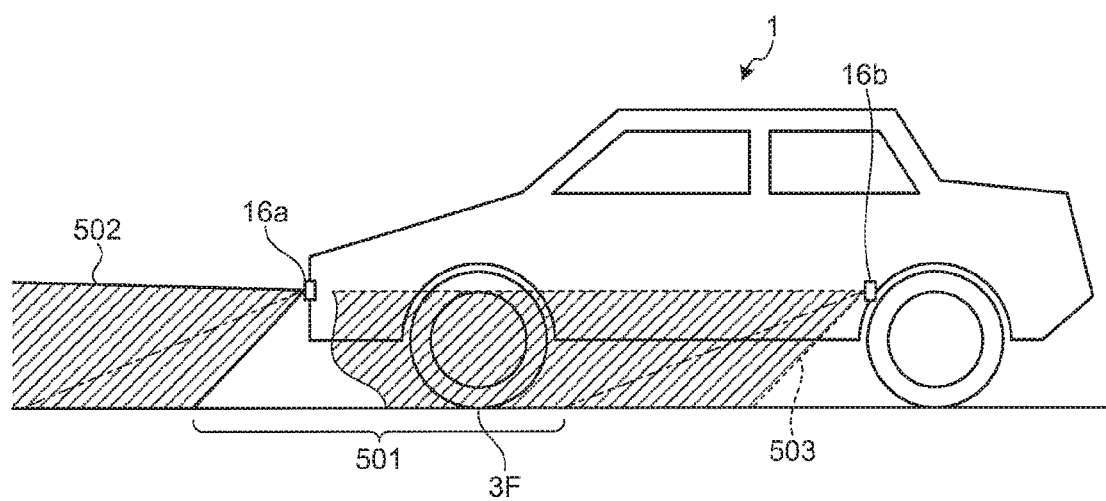
FIG. 5 is a schematic illustrating an imaging region captured by an imager in the vehicle according to the first embodiment.

FIG. 5 is a schematic illustrating an imaging region captured by the imager 16a in the vehicle 1 according to the embodiment. As illustrated in FIG. 5, the imager 16a captures an image of an area covering the road surface in the travelling direction of the vehicle 1 and an area above the road surface (in the direction opposite to the direction of gravity), the area including at least the horizon. However, a road surface 501 near the front wheels 3F of the vehicle 1 is not included in an imaging region 502 captured by the imager 16a. It is also difficult for an area below the floor near the front wheels 3F to be included in the imaging region, due to the location of the bumper in the vehicle 1 (due to the structure of the vehicle 1), for example.

Thus, while viewing currently generated image data, it is difficult for a user to see if there is any obstacle near the front wheels 3F of the vehicle 1. In view of this, the periphery monitoring unit 400 according to the embodiment can display image data previously generated by the imager 16a, in response to a user's request. That is, the image data previously generated refers to image data generated more behind than the current position of the vehicle 1.

For example, it is possible for the periphery monitoring unit 400 to present a user with image data of an imaging region 503, as image data generated by the imager 16a at a position behind the vehicle 1. Since the road surface 501 is included in the imaging region 503, a user can check the road surface 501 near the front wheels 3F. In this manner, the user can drive upon checking the condition of the road surface 501, reducing burdens involving driving. Referring back to FIG. 4, a configuration of the periphery monitoring unit 400 will now be explained.

The acquirer 401 acquires various types of information from various sensors of the vehicle 1. The acquirer 401 according to the embodiment acquires the image data from the imager 16a to 16d of the vehicle 1 that image the surroundings of the vehicle 1, and acceleration data from the acceleration sensor 26a, 26b of the vehicle 1. The acquirer 401 also acquires the steering angle information from the steering angle sensor 19, and the wheel speed information from the wheel speed sensor 22.

The acquirer 401 also associates image data whose imaging time and time at which acceleration is detected substantially match each other, the steering angle information, and the wheel speed information with one another.

The angle calculator 402 calculates an inclination angle (a pitch angle and a roll angle) of the vehicle 1, based on the acceleration data acquired by the acceleration sensors 26a, 26b. The pitch angle is an angle indicating an inclination of the vehicle 1 with respect to the lateral axis, and the roll angle is an angle indicating an inclination of the vehicle 1 with respect to the lengthwise axis.

The angle calculator 402 also associates the roll angle and the pitch angle calculated from acceleration data, with the image data associated with that acceleration data. This can allow the user to recognize the roll angle and the pitch angle of the vehicle 1 at the time at which the image data is generated.

The storing processor 403 includes a corrector 411, a position estimator 412, and a storing unit 413, and generates and stores the image data to be displayed on the display device 8.

The corrector 411 applies a rotation correction to image data including an image around the front side (travelling direction) of the vehicle 1, generated by the imager 16a.

The corrector 411 according to the embodiment applies a rotation correction to image data based on the roll angle associated with the image data, using the coordinates of the position at the center of the lens with which the imager 16a has generated the image data, as a point of origin of a display area of the image data. The data to be applied for the rotation correction is not limited to image data generated by the imager 16a, and may be image data including an image around the rear side of the vehicle 1, generated by the imager 16c, for example.

The corrector 411 also corrects the image data by cutting out an area including the bumper of the vehicle 1, from the image data including an image around the front side (in the travelling direction) of the vehicle 1, generated by the imager 16a.

The position estimator 412 calculates the moving amount of the vehicle 1 from the position at which a previous image has been generated, based on the acceleration data, the steering angle information, and the wheel speed information, and estimates the current position of the vehicle 1.

The position estimator 412 may also estimate the current position of the vehicle 1 by calculating the moving amount of the vehicle 1 from the optical flow based on the image data. When a user intends to understand the underfloor condition of the vehicle 1, e.g., the condition near the front wheels 3F of the vehicle 1, the user is often driving off-road. In the off-road driving, the wheels 3 may slip, for example, due to a rough road surface, for example. In such a case, an estimated moving amount of the vehicle 1 based on the rotation speed of the wheels 3 may be very likely to include error. In such a case, estimating the moving amount of the vehicle 1 and the position of the vehicle 1 based on the optical flow enables improvement in the accuracy of estimation of the current position.

The storing unit 413 stores the corrected image data by the corrector 411, in the ring buffer 404, together with the position information of the vehicle 1. Interval at which data is stored is not limited to any particular interval, and the data may be stored in every 0.1 meter, for example. In the embodiment, to display the underfloor of the vehicle 1, past image data is displayed. In the embodiment, when the image data is switched to past image data, image data generated during the period between when the current image data is generated and when the past image data is generated is sequentially displayed as an animation. In this manner, a video representing a movement of the vehicle 1 going back the route in which the vehicle 1 has proceeded is displayed, starting from the current image data. In this manner, a user can understand which area is being displayed on the display device 8. In the embodiment, image data is stored in units of 0.1 meter, but this storing interval may be any interval at which the animation is displayed smoothly.

Figure 6:
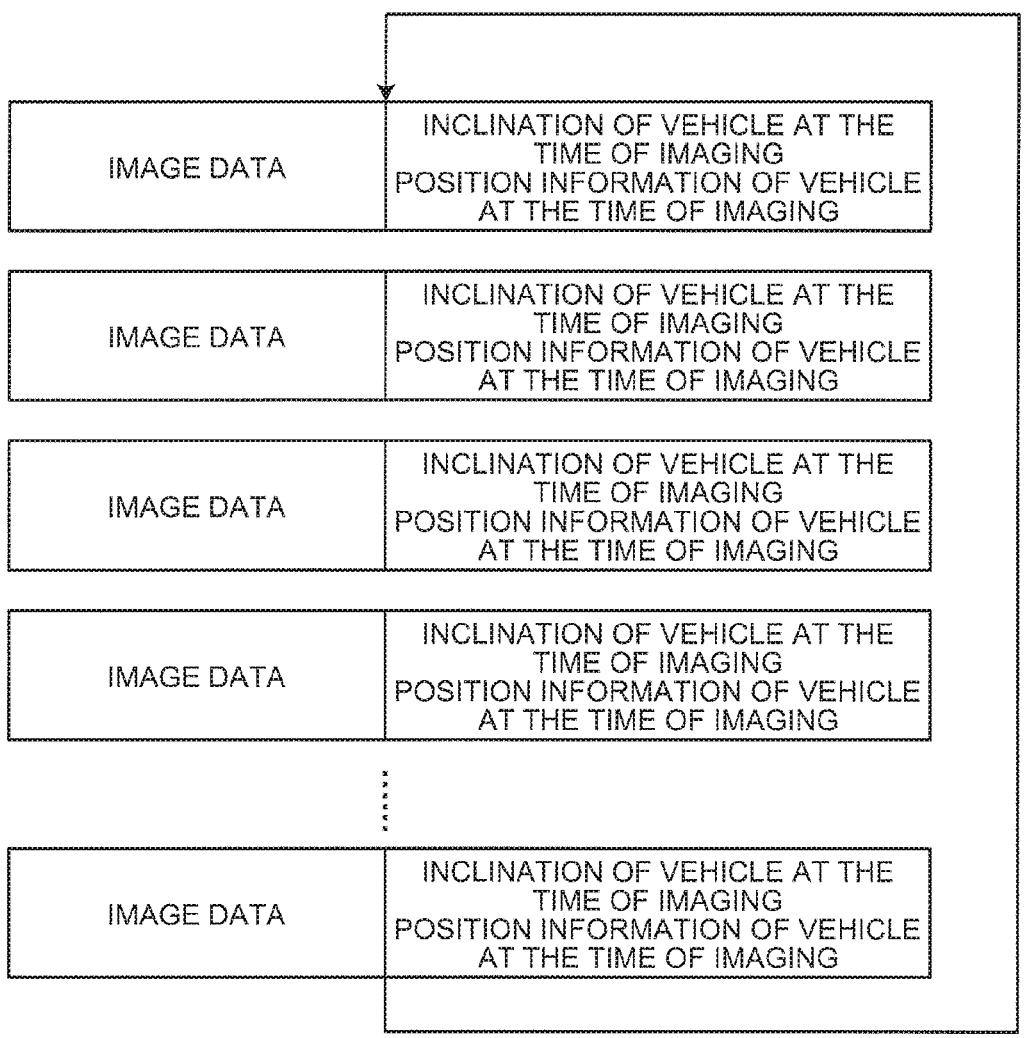
FIG. 6 is a schematic illustrating a structure of a ring buffer according to the first embodiment.

The ring buffer 404 stores therein the current image data output from the imager 16a that images the area including the road surface in the travelling direction of the vehicle, in association with the information at the time of generation of the image data. FIG. 6 is a schematic illustrating a configuration of the ring buffer 404. As illustrated in FIG. 6, the ring buffer 404 stores therein image data, and an inclination (travelling direction) and the position information of the vehicle 1 at the time at which the image data is generated, in association with one another. The image data stored in the ring buffer 404 is not limited to the image data output from the imager 16a. When the vehicle 1 is moving backwards, the image data output from the imager 16c may be stored in association with the information of the time at which the image is captured. In this manner, the underfloor condition can be displayed even while the vehicle 1 is moving backwards.

As illustrated in FIG. 6, the ring buffer 404 is a buffer that is logically arranged in ring form. In the ring buffer 404, in response to a storing request from the storing unit 413, a most previously updated area is overwritten with the image data for which storing has been requested.

The receiver 405 receives command signals (control signals) from the operation input 10, for example. Among these command signals, the receiver 405 according to the embodiment receives a switching operation to designate which one of the current image data being generated by the imager 16a and the past image data stored in the ring buffer 404 (that is, image data for underfloor display of the vehicle 1) is to be displayed on the display device 8.

The switching controller 406 switches a current image display mode (first display mode) to a past image display mode (second display mode) when the image data stored in the ring buffer 404 is to be displayed. The current image display mode (first display mode) is a mode for displaying the currently generated image data by the imager 16 and including a road surface in the direction in which the vehicle 1 is currently travelling. The past image display mode (second display mode) is a mode for displaying image data previously generated by the imager 16 and including a road surface in the direction in which the vehicle 1 has travelled in the past, as image data representing the underfloor condition of the vehicle 1.

The display processor 407 includes an image selector 421, a superimposer 422, and an output 423, and performs display operation to the display device 8, based on an operation received by the receiver 405.

Figure 7:
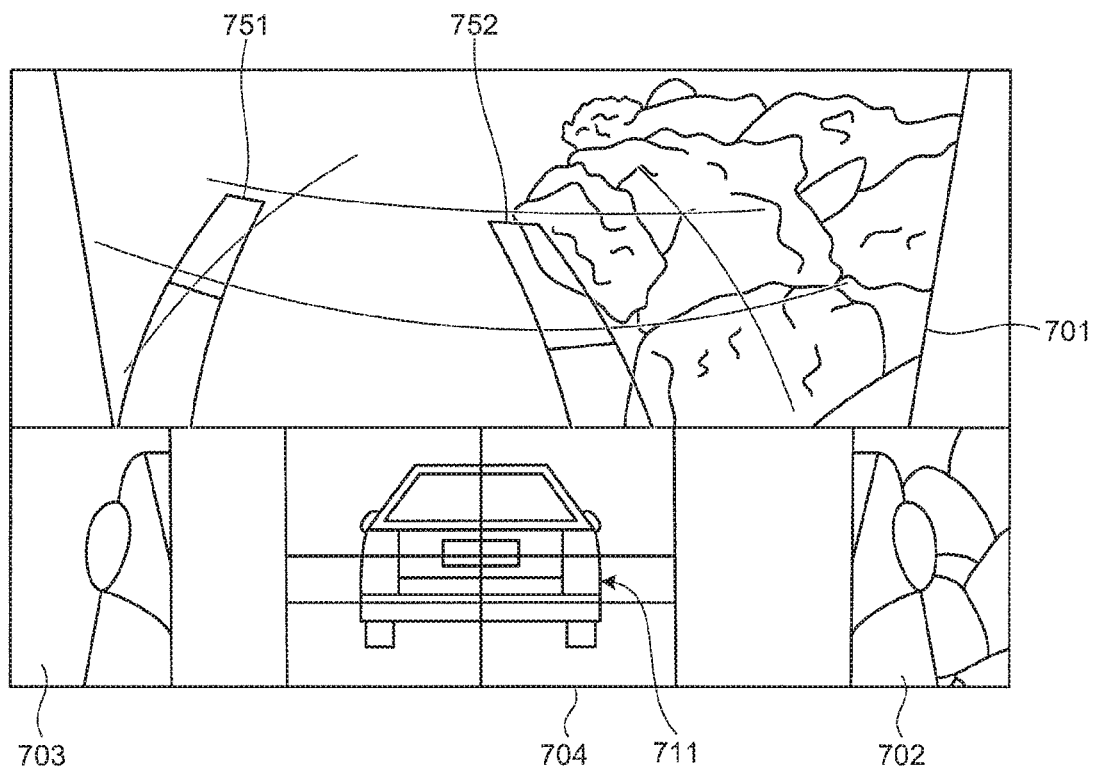
FIG. 7 is a schematic illustrating an exemplary screen in a current image display mode to be displayed by a display processor according to the first embodiment.

FIG. 7 is a schematic illustrating an exemplary screen in the current image display mode to be displayed by the display processor 407. As illustrated in FIG. 7, the exemplary screen in the current image display mode presents, in addition to image data 701 being generated by the imager 16a, image data 702 being generated by the imager 16d near the right front wheel 3F of the vehicle 1, and image data 703 being generated by the imager 16b near the left front wheel 3F of the vehicle 1. Furthermore, a display area 704 displays information recognizably representing the pitch angle and the roll angle of the vehicle 1. In other words, the roll angle is represented by an inclination of an icon 711 indicating the vehicle 1, and the pitch angle is represented by a distance between a center line passing through the icon 711 and the horizon. In the embodiment, such a display mode is used to present the roll angle and the pitch angle in a recognizable manner, but the embodiment is not limited thereto, and the display mode may be any other display mode.

The image data 701 also displays trajectories 751, 752 indicating the travelling directions of the front wheels 3F based on the steering angle acquired from the steering angle sensor 19. In this manner, a user can drive upon checking the travelling direction of the vehicle 1.

With the exemplary screen illustrated in FIG. 7, however, it is difficult to check the condition near the area under the floor of the vehicle 1. To address this issue, in the periphery monitoring unit 400 according to the embodiment, the switching controller 406 performs switching control to display an area near the underfloor of the vehicle 1, that is, to switch to the past image display mode. The switching method is not limited to any particular method, and the switching controller 406 may be configured to switch the screen being displayed by the display processor 407 when a pressing of a display switching button is received by the receiver 405 after the vehicle 1 has stopped, for example.

Figure 8:
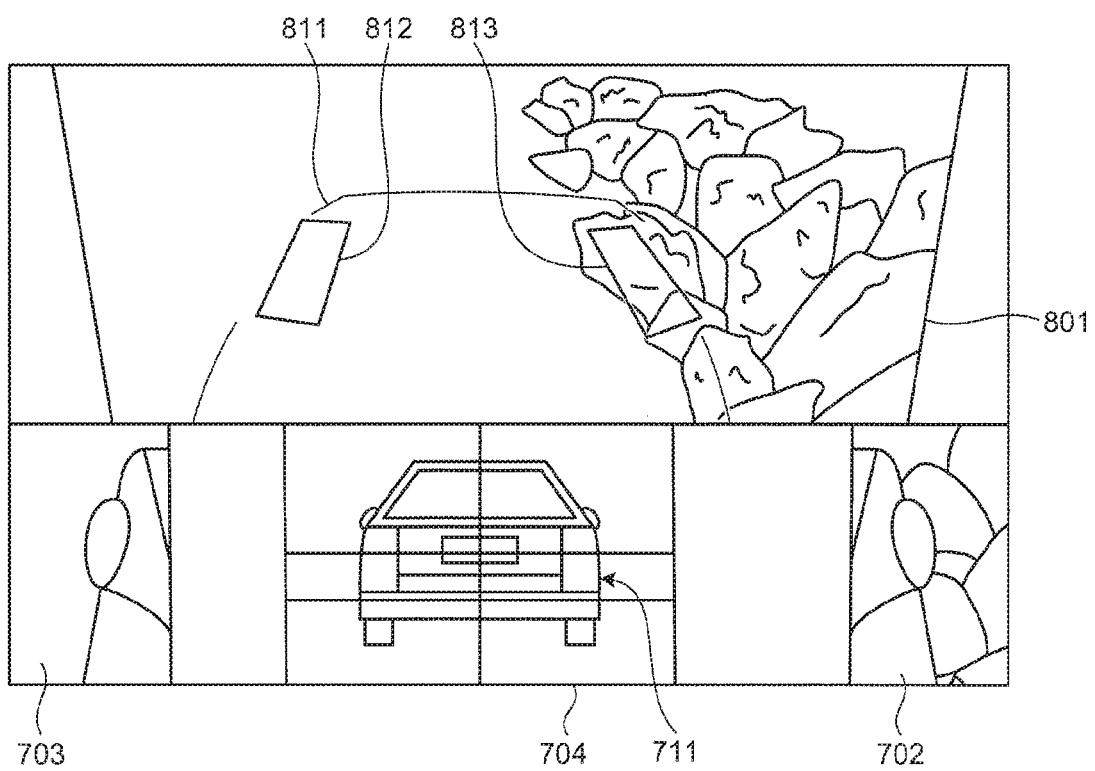
FIG. 8 is a schematic illustrating an exemplary screen in a past image display mode to be displayed by the display processor according to the first embodiment.

FIG. 8 is a schematic illustrating an exemplary screen in the past image display mode to be displayed by the display processor 407. In the example illustrated in FIG. 8, the image data 702 of near the right front wheel 3F, the image data 703 of near the left front wheel 3F of the vehicle 1, and the display area 704 recognizably displaying the roll angle and the pitch angle are the same as those in FIG. 7 that show the current condition of the vehicle 1.

Image data 801 is image data previously generated by the imager 16a of the vehicle 1. The current position of the vehicle 1 in the image data 801 can be estimated from the moving amount of the vehicle 1, calculated after the image data 801 is generated. The display processor 407 therefore displays identification information identifiably representing the current position of the vehicle 1. In the example illustrated in FIG. 8, a contour line 811 representing the outer form of the vehicle 1, and contour lines 812, 813 representing the outer forms of the front wheels 3F of the vehicle 1 are displayed, as an example of the identification information by which the current position of the vehicle 1 is identifiable.

The contour lines 812, 813 representing the outer forms of the front wheels 3F are contour lines based on the current steering angle detected by the steering angle sensor 19. Thereby, a user can recognize the current tire angle and the current position of the vehicle 1 by viewing the contour lines 812, 813. The contour line 811 representing the outer form of the vehicle 1 and the contour lines 812, 813 representing the outer forms of the front wheels 3F are superimposed on the image data 801 for display. This makes it possible for a user to recognize the road surface, and the condition of the road surface below the floor including near the front wheels 3F of the vehicle 1. Thereby, the periphery monitoring unit 400 can provide a user with an environment for driving the vehicle to avoid an obstacle near the front wheels 3F, for example. In this manner, the embodiment can reduce the burdens on driving, and improve the convenience in the driving.

The information to superimpose on the image data is not limited to the identification information by which certain parts of the vehicle 1 is identifiable (such as the contour lines 811, 812, 813). The display processor 407 according to the embodiment may display trajectories in the travelling direction based on the current steering angle of the vehicle 1, for example, on the image data, in response to a request of a user.

Referring back to FIG. 4, a configuration of the display processor 407 will now be explained. The image selector 421 selects image data to be displayed on the display device 8, from the image data stored in the ring buffer 404, when the receiver 405 receives an operation for switching to the past image display mode (for underfloor display of the vehicle 1).

When the switching controller 406 switches the current image display mode to the past image display mode, the image selector 421 according to the embodiment sequentially selects image data generated by the imager 16 during the period between when the current image data is generated by the imager 16, and when the image data to be displayed in the past image display mode is generated, from the ring buffer 404.

The image selector 421 then selects the most previous image data from the image data stored in the ring buffer 404, as the image data to be displayed in the past image display mode (the image data for underfloor display of the vehicle 1).

Figure 9:
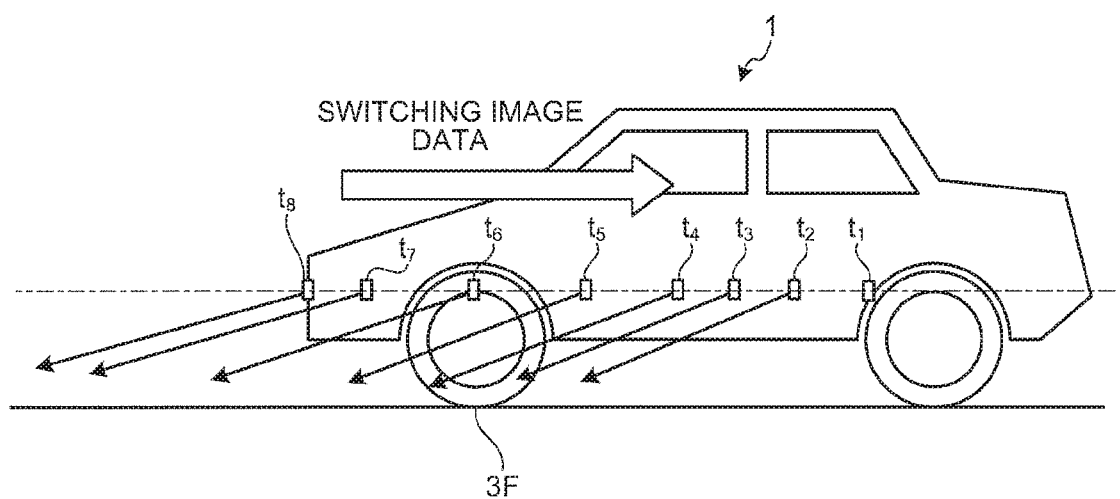
FIG. 9 is a schematic for explaining a transition of the image data selected by an image selector according to the first embodiment.

FIG. 9 is a schematic for explaining a transition of the image data selected by the image selector 421. As illustrated in FIG. 9, the image selector 421 sequentially selects the image data generated at time $t_7$ to time $t_2$, respectively, that are between current time $t_8$ and time $t_1$ at which the image data to be displayed in the past image display mode is generated. After selecting the image data generated at the time $t_7$ to the time $t_2$ in a retrospective manner from now to the past as described above, the image selector 421 selects the image data generated at the time $t_1$. Thus, the display device 8 according to the embodiment can implement an animation display of the image data until the underfloor of the vehicle 1 is displayed.

The superimposer 422 superimposes the information indicating the current position of the vehicle on the image data. The superimposer 422 according to the embodiment superimposes the identification information by which the current position of the vehicle 1 is identifiable (the contour line indicating the outer form of the vehicle 1, and the contour lines indicating the outer forms of the front wheels 3F of the vehicle 1) on the display area of the image data selected by the image selector 421, based on the position information of the vehicle 1 at the current time $t_8$, and based on the position information that is associated with the image data selected by the image selector 421. Thus, for the animation display, the output 423 can sequentially output image data on which the identification information on the current position of the vehicle is superimposed for display.

For switching the display from the currently generated image data by the imager 16 to the past image data previously generated by the imager 16, the output 423 sequentially outputs the image data generated by the imager 16 having the identification information superimposed thereon by the superimposer 422, during the period between the time $t_8$ at which the current image data is generated and the time $t_1$ at which the past image data is generated (the image data generated at the time $t_2$ to the time $t_7$).

Figure 10:
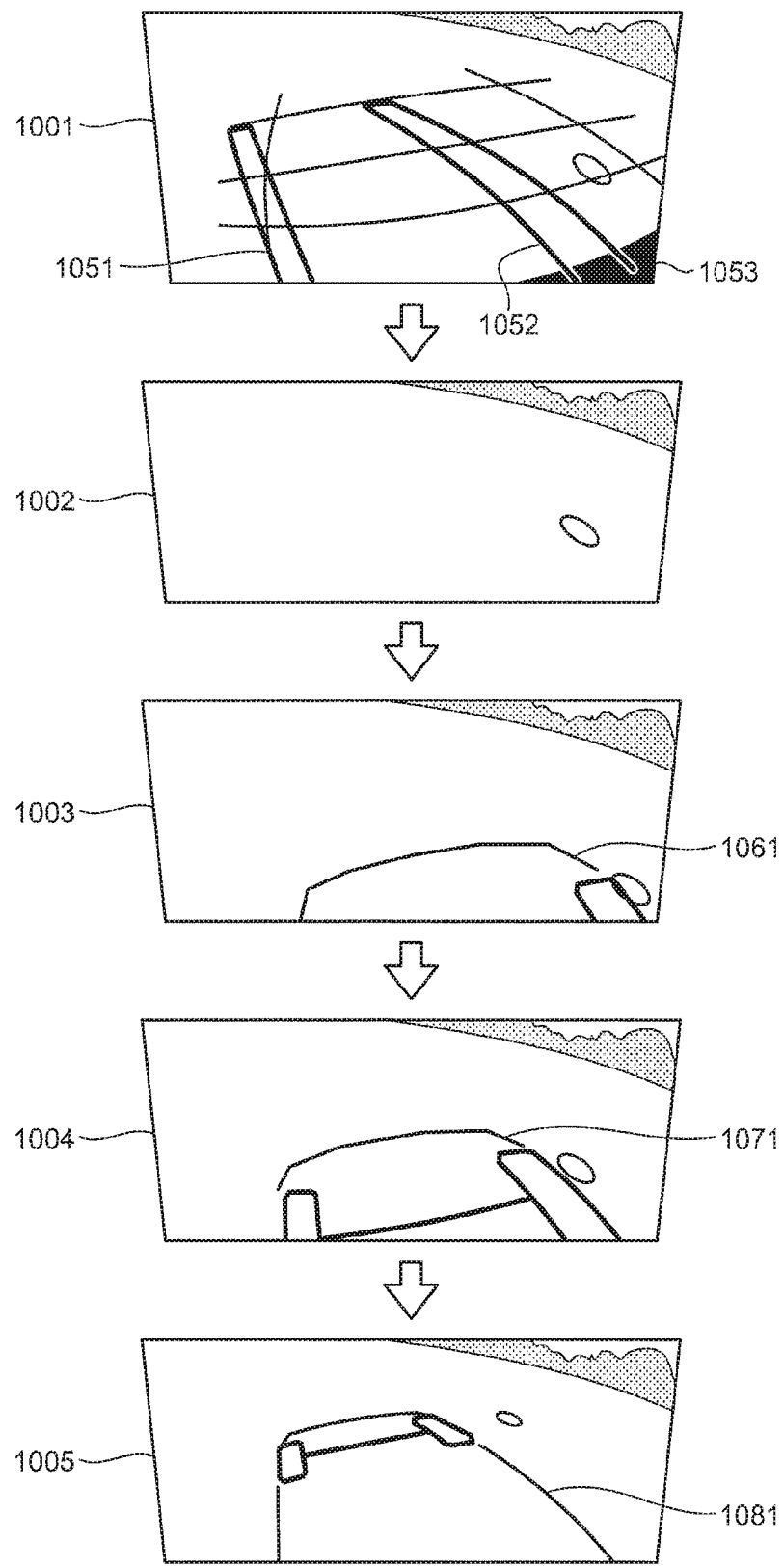
FIG. 10 is a schematic illustrating a transition of the display area output to a display device by an output according to the first embodiment.

FIG. 10 is a schematic illustrating a transition of the display area output to the display device 8 by the output 423.

A display area 1001 in FIG. 10 shows the currently generated image data by the imager 16a. Trajectories 1051, 1052 indicating the travelling direction are superimposed on the image data displayed in the display area 1001. A bumper 1053 appears in the image data.

The receiver 405 then receives a switching operation from the current image display mode to the past image display mode (second display mode). In response to this, the switching controller 406 switches the current image display mode (first display mode) to the past image display mode (second display mode). Then, the output 423 sequentially outputs display areas 1002 to 1005 (as going back in time).

The display area 1002 displays the currently generated image data by the imager 16a. The image data displayed in the display area 1002 omits the trajectories 1051, 1052 and the bumper 1053, compared with the image data displayed in the display area 1001.

The display area 1003 then displays the image data previously generated by the imager 16a (e.g., at the time $t_7$ or the time $t_6$ illustrated in FIG. 9). Identification information 1061 indicating the current position of the vehicle 1 is superimposed on the image data displayed in the display area 1003.

The display area 1004 presents the image data more previously generated by the imager 16a than the image data displayed in the display area 1003 (e.g., at the time $t_5$ to the time $t_2$ illustrated in FIG. 9). Identification information 1071 indicating the current position of the vehicle 1 is also superimposed on the image data displayed in the display area 1004. In this manner, the identification information on the current position of the vehicle 1 gradually transits as moving forwards, which enables a user to understand what kind of image data is currently being displayed.

The display area 1005 shows image data previously generated by the imager 16a (e.g., at the time $t_1$ illustrated in FIG. 9) and representing the underfloor of the vehicle 1 in the past image display mode. This image data is the most previous image data stored in the ring buffer 404. Identification information 1081 indicating the current position of the vehicle 1 is also superimposed on the image data displayed in the display area 1005. In this manner, a user can understand the underfloor condition of the vehicle 1 and the positional relationship with respect to the vehicle 1.

Figure 11:
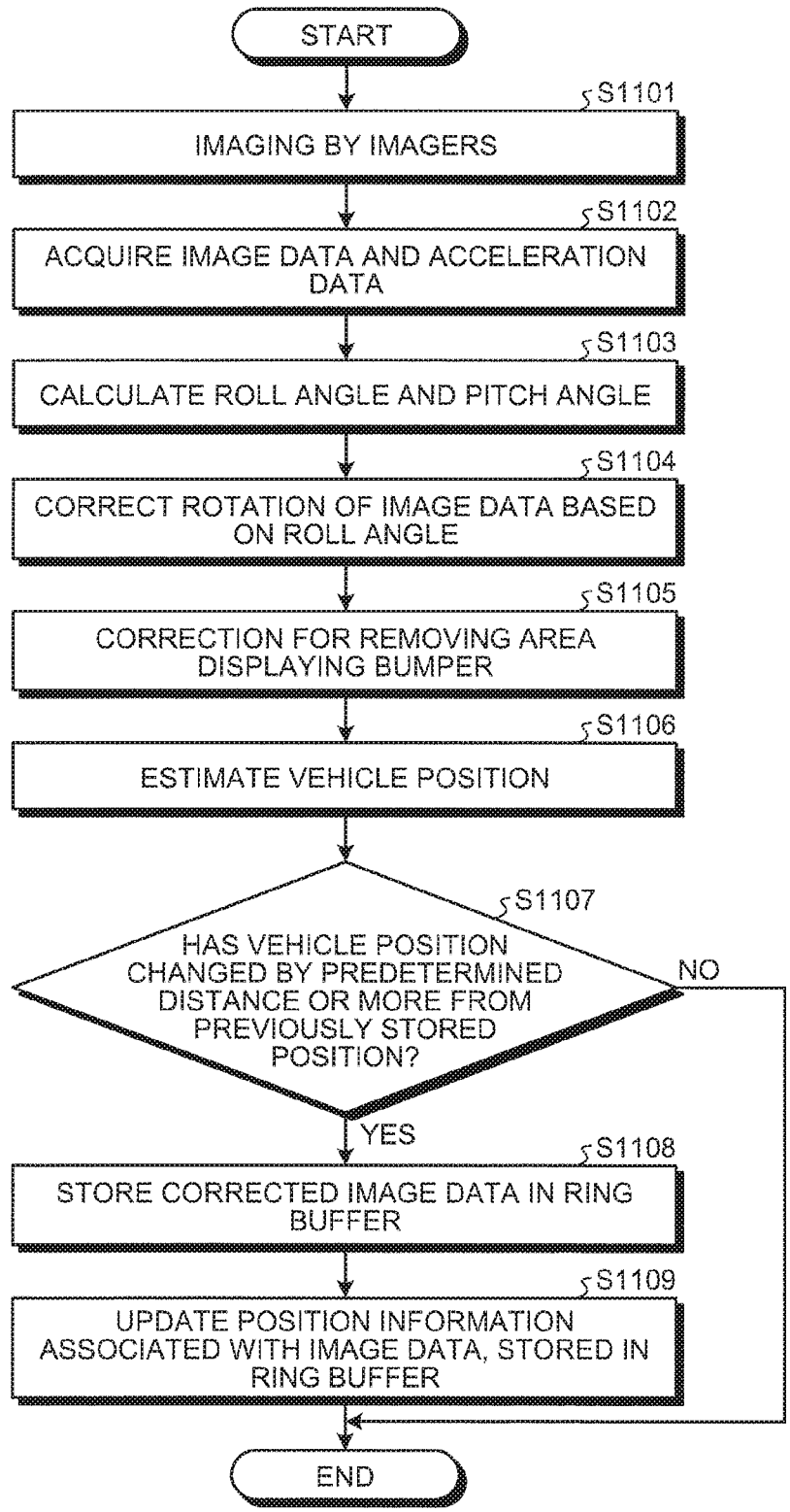
FIG. 11 is a flowchart illustrating the processing sequence for storing image data in the periphery monitoring unit according to the first embodiment.

A process for storing the image data in the periphery monitoring unit 400 according to the embodiment will now be explained. FIG. 11 is a flowchart illustrating the processing sequence of the periphery monitoring unit 400 according to the embodiment.

To begin with, the imagers 16 image the surroundings of the vehicle 1 (S1101). Particularly, the imager 16a images an area including the road surface and the horizon, within the area in the travelling direction of the vehicle 1.

The acquirer 401 then acquires the image data from the imagers 16, and the acceleration data from the acceleration sensors 26 (S1102).

The angle calculator 402 then calculates the roll angle and the pitch angle of the vehicle 1 from the acceleration data (S1103).

The corrector 411 then applies a rotation correction to the image data based on the roll angle (S1104).

The corrector 411 then corrects the image data by removing the area including which the bumper from the image data (S1105).

The position estimator 412 then calculates the moving amount of the vehicle 1, and estimates the current position of the vehicle 1 based on the acceleration data, the steering angle information, and the wheel speed information (S1106).

The storing unit 413 then determines whether the position of the vehicle 1 has changed by a certain distance (e.g., 0.1 meter) or more from the position at which the current image data is stored immediately previously (S1107). If the storing unit 413 determines that the position has not changed by the certain distance (No at S1107), the process is ended. The embodiment describes an example of storing the current image data when the position has changed by a certain distance or more. The storing method is, however, not limited thereto, and the current image data may be stored when the position has changed by a certain steering angle or more, or may be stored at certain time interval.

If the storing unit 413 determines that the position has changed by the certain distance (e.g., 0.1 meter) or more from the position at which the image data is stored previously (Yes at S1107), the storing unit 413 overwrites the most previously updated area of the ring buffer 404 with the corrected current image data (S1108). The storing unit 413 then stores the current image data in association with the position information of the image data.

The storing unit 413 then updates the position information at the time of generating the image data stored in the ring buffer 404 to the position information based on the current position (as the point of origin) (S1109). By the update, the ring buffer 404 can retain the position information continuously without overflow.

The periphery monitoring unit 400 according to the embodiment can then provide the image data stored in the ring buffer 404 as the image data for underfloor display.

Figure 12:
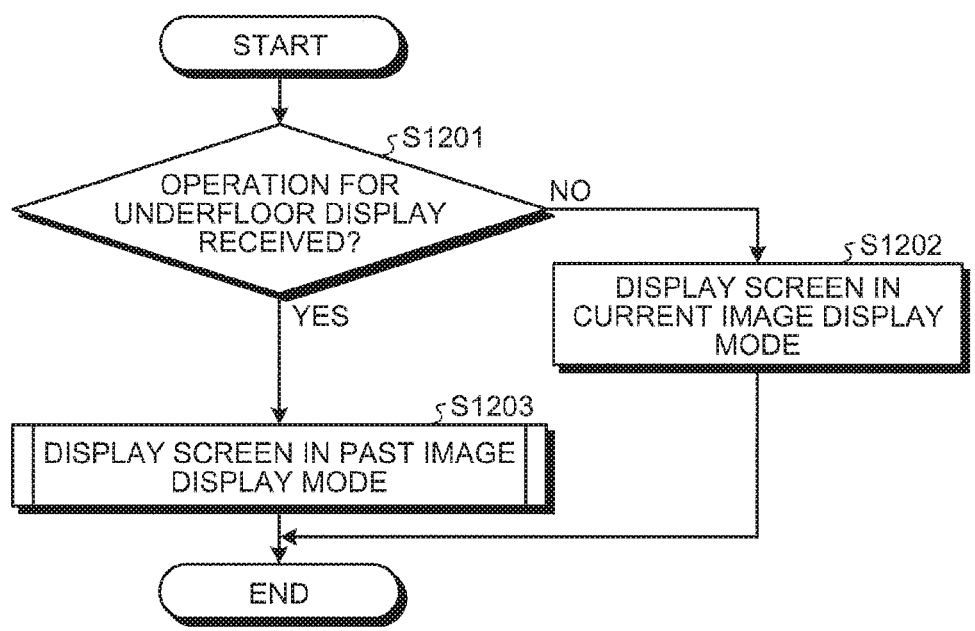
FIG. 12 is a flowchart illustrating the display processing sequence of the periphery monitoring unit according to the first embodiment.

A display operation of the periphery monitoring unit 400 according to the embodiment will now be explained. FIG. 12 is a flowchart illustrating the processing sequence of the periphery monitoring unit 400 according to the embodiment.

To begin with, the periphery monitoring unit 400 determines whether the receiver 405 has received an operation for underfloor display (display in the past image display mode) (S1201). If it determines that the receiver 405 has not received an operation for underfloor display (display in the past image display mode) (No at S1201), the display processor 407 displays a screen in the current image display mode (S1202).

If it determines that the receiver 405 has received an operation for underfloor display (display in the past image display mode) (Yes at S1201), the switching controller 406 switches the current image display mode to the past image display mode, and the display processor 407 displays a screen in the past image display mode (S1203).

Figure 13:
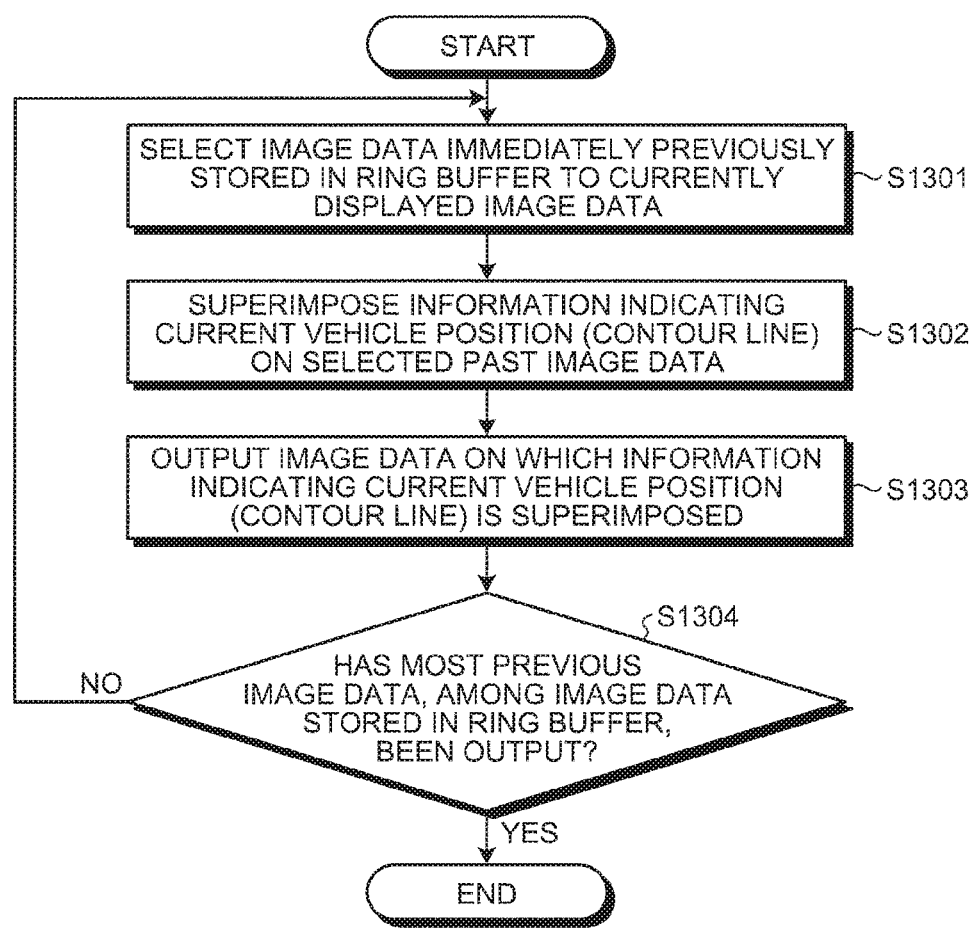
FIG. 13 is a flowchart illustrating the processing sequence of displaying a screen in the past image display mode, in the periphery monitoring unit according to the first embodiment.

Screen display in the past image display mode at S1203 in FIG. 12 will now be explained. FIG. 13 is a flowchart illustrating the processing sequence of the periphery monitoring unit 400 according to the embodiment.

First, the image selector 421 selects image data immediately previous to the currently displayed image data (stored immediately previously), from among the image data stored in the ring buffer 404 (S1301).

The superimposer 422 superimposes the information indicating the current position of the vehicle (contour lines) on the selected image data (S1302).

The output 423 outputs the image data on which the information indicating the current position of the vehicle (contour lines) is superimposed, to the display device 8 (S1303).

The image selector 421 determines whether the most previous image data, among the image data stored in the ring buffer 404, has been output (S1304). If the image selector 421 determines that the most previous image data has not been output yet (No at S1304), the process is repeated from S1301.

If the image selector 421 determines that the most previous image data has been output (Yes at S1304), the process is ended, considering that the image data has been displayed in the past image display mode.

Through the control described above, by sequentially displaying the image data stored in the ring buffer 404, the periphery monitoring unit 400 according to the embodiment enables a user to recognize that the display mode is being switched to the past image display mode.

The embodiment has described an example in which the display is switched by a pressing of the display switching button. However, when the display is switched is not limited thereto. For example, the past image data may be always displayed while the vehicle is moving, or the display may be switched to the past image data under the condition that the vehicle 1 has stopped.

The embodiment has also described an example of switching the current image display mode to the past image display mode. Alternatively, the above display control may also be applied to switching the past image display mode to the current image display mode, for example.

Second Embodiment

The first embodiment has described an example of sequentially outputting the image data from the ring buffer 404 to the display device 8. However, the embodiment is not limited to such example of sequentially outputting the image data from the ring buffer 404 to the display device 8. The display device 8 may also sequentially display any information as long as the information represents a transition of the image data during the period between the two modes, at the time of switching the display of the image data in the current image display mode to the display of the past image data in the past image display mode. A second embodiment describes an example of sequentially outputting, to the past image, information representing a transition of the movement of the vehicle 1 from when the past image data is generated and to when the current image data is generated.

The periphery monitoring unit has the same configuration as that according to the first embodiment, and explanations thereof will be omitted.

Figure 14:
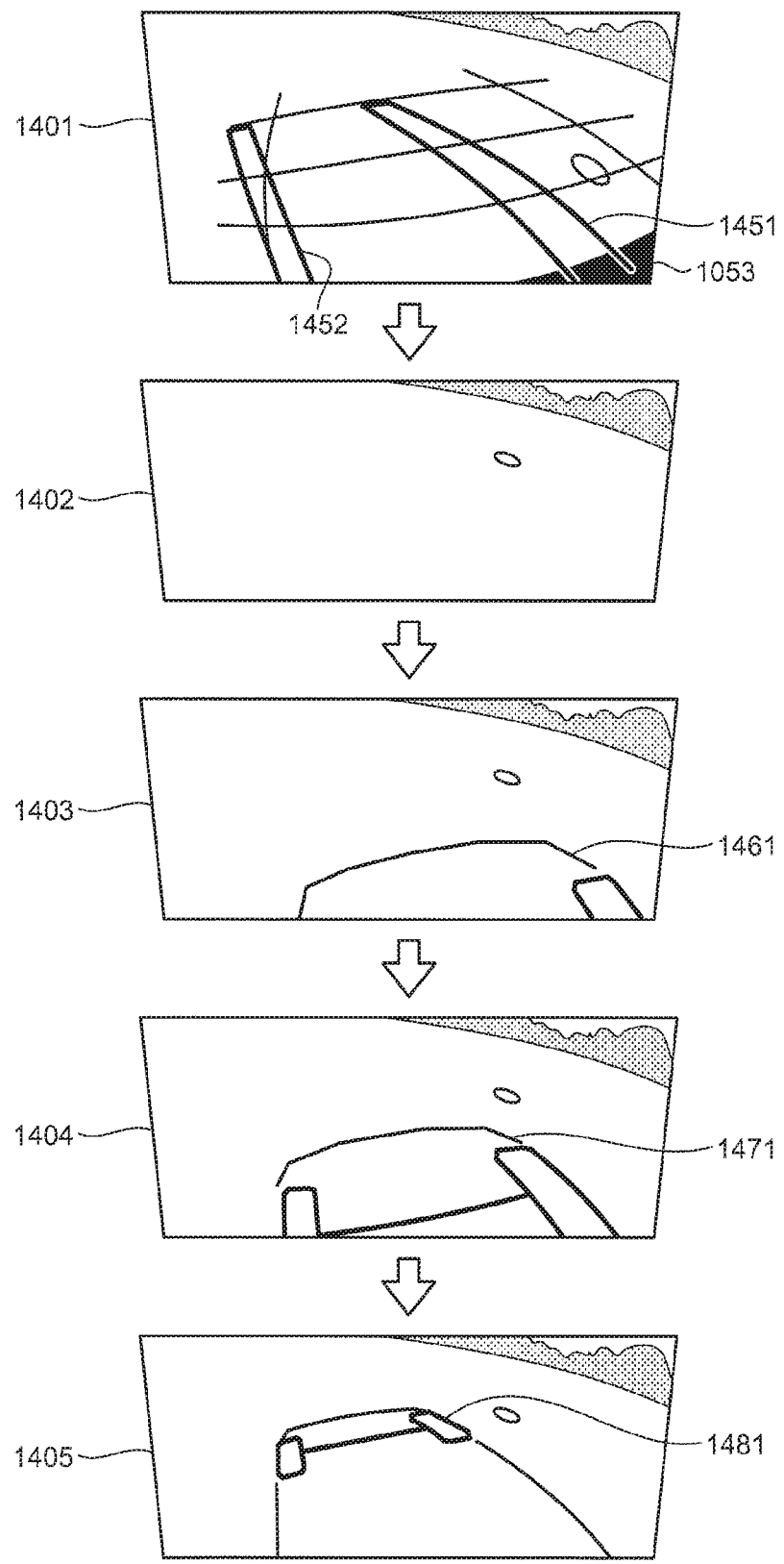
FIG. 14 is a schematic illustrating a transition of the display areas output to the display device by an output according to a second embodiment.

FIG. 14 is a schematic illustrating a transition of the display areas output to the display device 8 by the output 423.

A display area 1401 illustrated in FIG. 14 displays the currently generated image data by the imager 16*a*. Trajectories 1451, 1452 indicating the travelling direction are superimposed on the image data displayed in the display area 1401. The bumper 1053 also appears in the image data.

The receiver 405 then receives an operation of switching the current image display mode (first display mode) to the past image display mode (second display mode). In response to this, the switching controller 406 switches the current image display mode (first display mode) to the past image display mode (second display mode). Then, the output 423 sequentially outputs in order of display areas 1402 to 1405.

The display area 1402 then displays the most previous image data among the image data stored in the ring buffer 404.

The display area 1403 displays the most previous image data on which identification information 1461 on the position of the vehicle 1 is superimposed, based on the position information associated with the image data previously generated by the imager 16*a* (at the time $t_2$ or the time $t_3$ illustrated in FIG. 9, for example).

The display area 1404 displays the most previous image data on which identification information 1471 on the position of the vehicle 1 is superimposed, based on the position information associated with the image data that is more current than the image data displayed in the display area 1403 (e.g., the image data generated at the time $t_4$ to the time $t_7$ illustrated in FIG. 9). Thereby, an animation display showing that the vehicle 1 is moving toward the current position is implemented.

The display area 1405 displays the most previous image data on which the identification information 1481 on the position of the vehicle 1 is superimposed, based on the position information associated with the current image data (e.g., generated at the time $t_8$ illustrated in FIG. 9).

Thus, in the embodiment, at the time of switching the display from the currently generated image data by the imager 16 to the image data previously generated by the imager 16, the output 423 sequentially outputs, to the past image data, information representing a transition of the movement of the vehicle 1 during the period between when the past image data is generated to when the current image data is generated.

By such display, a user can recognize the switching of the display to the past image data.

Figure 15:
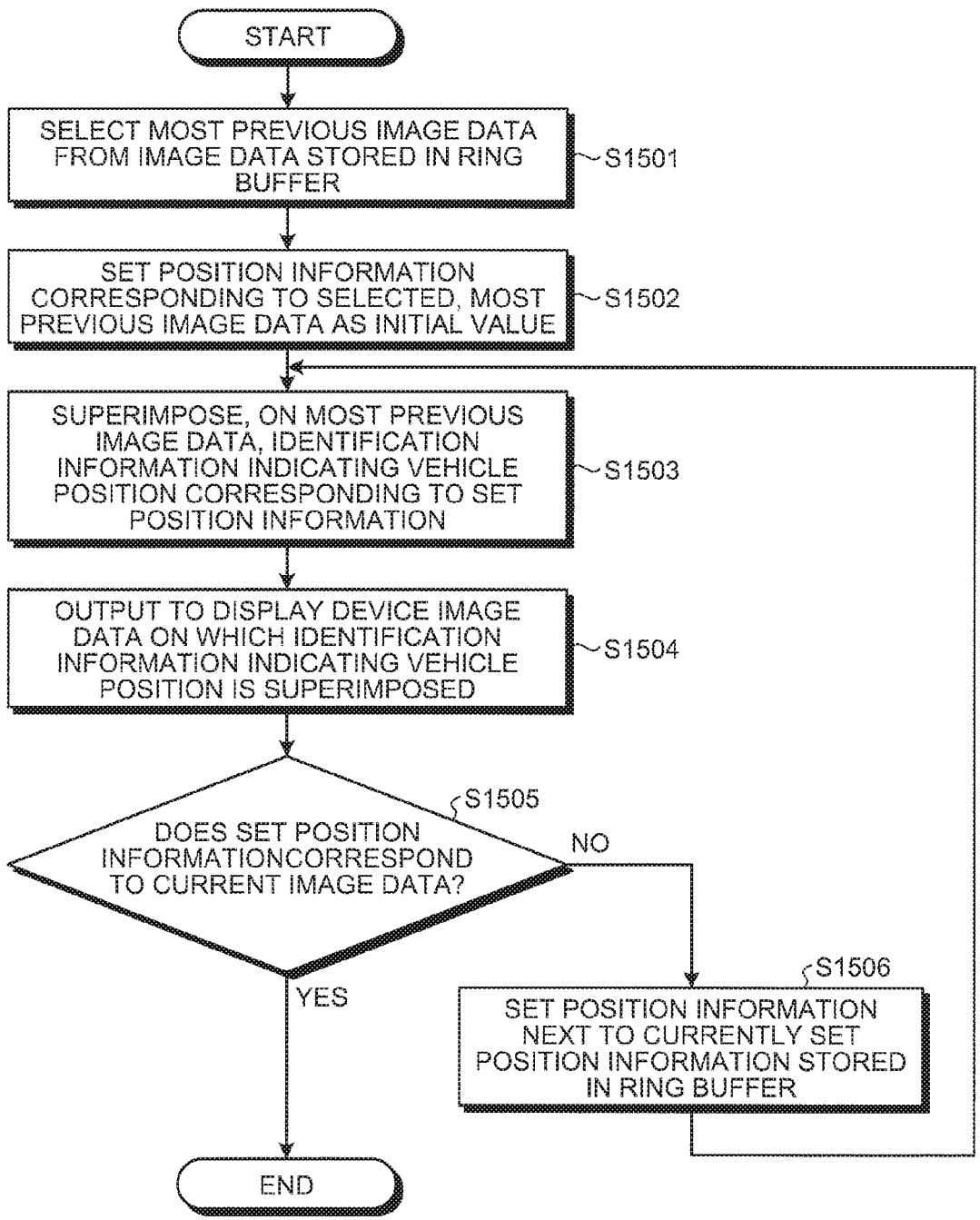
FIG. 15 is a flowchart illustrating the processing sequence of displaying a screen in the past image display mode in a periphery monitoring unit according to a second embodiment.

Screen display in the past image display mode at S1203 illustrated in FIG. 12 will now be explained. FIG. 15 is a flowchart illustrating the processing sequence of the periphery monitoring unit 400 according to the embodiment.

First, the image selector 421 selects the most previous image data from among the image data stored in the ring buffer 404 (S1501).

The image selector 421 then sets the position information corresponding to the selected most previous image data as an initial value (S1502).

The superimposer 422 then superimposes, on the most previous image data, the identification information on the position of the vehicle 1 corresponding to the set position information (S1503). While the position information is set to the initial value, identification information on the position of the vehicle 1 is not superimposed.

The output 423 then outputs, to the display device 8, the image data on which the identification information on the position of the vehicle 1 is superimposed (S1504).

The image selector 421 then determines whether the set position information corresponds to the current image data (S1505). If the image selector 421 determines that the set position information does not correspond to the current image data (No at S1505), the image selector 421 sets position information that is more recent than the set position information by one, among the image data stored in the ring buffer 404, as the parameter used in the superimposition at S1503 (S1506), and performs the process at S1503 and thereafter.

If the image selector 421 determines that the set position information corresponds to the current image data (Yes at S1505), the process is ended.

Through the control as described above, the periphery monitoring unit 400 according to the embodiment enables a user to recognize that the display mode is being switched to the past image display mode, by displaying the transition of the movement of the vehicle 1 based on the position information stored in the ring buffer 404.

Modification

The above embodiment has described an example of displaying the image data stored in the ring buffer 404 when the display mode is switched to the past image display mode after the storing processor 403 has stored the previous image data in the ring buffer 404.

However, the embodiment is not limited to such a displaying sequence, and image data synthesized with previous image data may be displayed as image data representing the underfloor condition of the vehicle 1.

In this modification, after image data generated by the imager 16a is subjected to the same rotation correction, as in the above embodiments, the storing processor 403 generates bird-eye view image data showing the ground around the vehicle 1 in the travelling direction from above, from the image data.

The position estimator 412 then estimates the moving amount of the vehicle 1 between the position at which the current image data is generated and the position at which the previous image data is generated.

The storing processor 403 then synthesizes current bird-eye view image data with the previous bird-eye view image data, based on the moving amount.

If the receiver 405 receives an operation of switching the current image display mode (first display mode) to the past image display mode (second display mode), the superimposer 422 superimposes information on the current position of the vehicle 1 on the bird-eye view image data. The display processor 407 then switches the current image data to the synthesized bird-eye view image data. The bird-eye view image data may be subjected to image conversion to the one viewed from a certain viewpoint (e.g., the position where the image data is generated by the imager 16). The display processor 407 then displays the bird-eye view image data in retrospective scroll mode (animation display), from the most recently synthesized area to the most previously synthesized area.

According to the embodiments and the modification described above, for switching the current image display mode (first display mode) and the past image display mode (second display mode), a user can easily recognize that the mode is being switched, by sequentially outputting information representing a transition of the image data between when the past image data is generated and when the current image data is generated, to the display device. Furthermore, by displaying the information representing a transition of the image data between when the past image data is generated and when the current image data is generated to the display device, a user can easily understand the positional relationship among the areas being displayed on the display device. By the vehicle underfloor display, a user can check the condition below the vehicle floor.

Embodiments of the present invention are explained above, but these embodiments are presented by way of example only, and are not intended to limit the scope of the present invention in any way. It is possible to implement these novel embodiments in various other embodiments, and various omissions, replacements, and modifications are still possible within the scope not deviating from the spirit of the present invention. Such embodiments and their modifications still fall within the scope of the present invention, and within the scope of the invention defined by the appended claims and equivalency thereof.

The invention claimed is:

1. A periphery monitoring device comprising:
a storage that stores therein image data generated by an imager that is mounted on a vehicle;
a switching controller that switches between a first display mode and a second display mode for display of the image data stored in the storage, the first display mode being a mode in which current image data is displayed, the second display mode being a mode in which the current image data is replaced by first past image data and only the first past image data is displayed and information indicating a current position of the vehicle is displayed to be superimposed on the first past image data, the current image data being currently generated by the imager, the first past image data is being previously generated by the imager; and
an output that outputs information to a display device at the time of switching between the first display mode for displaying the current image data being currently generated by the imager and the second display mode for displaying the first past image data previously generated by the imager, the information representing a transition of the image data between when the first past image data is generated and when the current image data is generated.

2. The periphery monitoring device according to claim 1, wherein
at the time of switching the display of the current image data being currently generated by the imager to the display of the first past image data previously generated by the imager, the output outputs image data generated by the imager during a period from when the current image data is generated and to when the first past image data is generated.

3. The periphery monitoring device according to claim 1, wherein
the output superimposes, for display of the first past image data generated by the imager, the information indicating the current position of the vehicle on the first past image data, and outputs a superimposed result.

4. The periphery monitoring device according to claim 1, wherein
at the time of switching the display of the current image data being currently generated by the imager to the display of the first past image data previously generated by the imager, the output outputs information to the first past image data, the information representing a transition of a movement of the vehicle during a period from when the first past image data is generated and to when the current image data is generated.

5. The periphery monitoring device according to claim 1, wherein the storage stores therein image data output from the imager that images an area including a road surface in a travelling direction of the vehicle, and the switching controller switches between the first display mode and the second display mode, the first display mode being a mode in which current image data including the road surface in a current travelling direction of the vehicle is displayed, the second display mode being a mode in which the first past image data including the road surface in a past travelling direction of the vehicle is displayed as image data representing an underfloor of the vehicle, the current image data and the first past image data both being generated by the imager.

6. The periphery monitoring device according to claim 3, wherein the output:

outputs second past image data captured between a capturing timing of the first past image data and a capturing timing of the current image data as information indicating transition between the capturing timing of the first past image data and the capturing timing of the current image data; and superimposes the information indicating the current position of the vehicle on the second past image data and outputs a superimposed result.

* * * * *